Sept. 20, 1966  F. JAKOB  3,273,479
CAMERAS WITH BUILT-IN FLASH ASSEMBLIES
Filed March 31, 1964  2 Sheets-Sheet 1

INVENTOR.
FRANZ JAKOB
BY
Michael J. Striker
Attorney

Sept. 20, 1966 F. JAKOB 3,273,479
CAMERAS WITH BUILT-IN FLASH ASSEMBLIES
Filed March 31, 1964 2 Sheets-Sheet 2
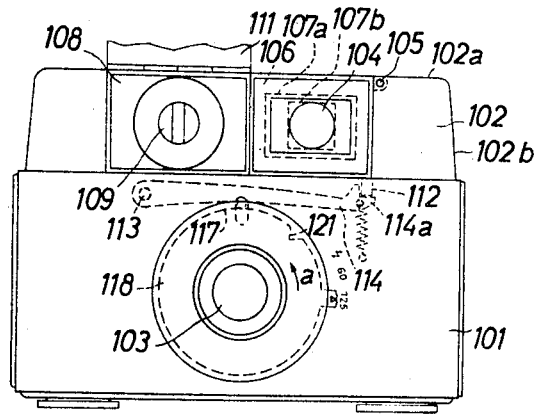
Fig.4
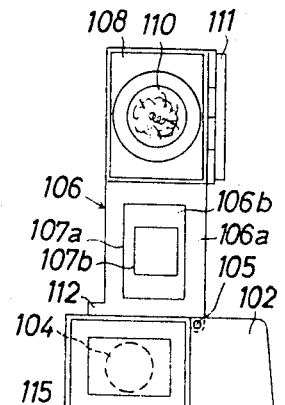
Fig.5
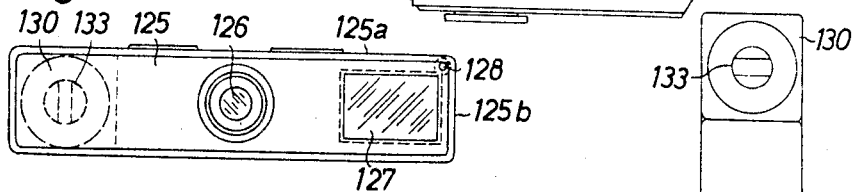
Fig.6
Fig.7
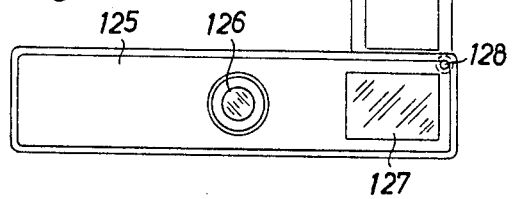
INVENTOR.
FRANZ JAKOB
BY

United States Patent Office 3,273,479
Patented Sept. 20, 1966

3,273,479
CAMERAS WITH BUILT-IN FLASH ASSEMBLIES
Franz Jakob, Unterhaching, Munich, Germany, assignor to Agfa Aktiengesellschaft, Leverkusen, Germany
Filed Mar. 31, 1964, Ser. No. 356,249
Claims priority, application Germany, Apr. 11, 1963, A 19,851; May 2, 1963, A 43,015
7 Claims. (Cl. 95—11)

The present invention relates to cameras.

More particularly, the present invention relates to cameras with built-in flash assemblies.

In order to keep the bulk of cameras of this type as small as possible the flash assemblies which are built-in necessarily have the reflector thereof, particularly a lower edge of the reflector, located quite close to the optical axis of the picture-taking objective of the camera. It has been found from experience that as a result of this arrangement when taking a photograph of a person the iris of the eye of the person who is photographed will appear to be red in the case of a color photgraph, and this is of course a highly undesirable result. It is possible to avoid this drawback by situating the flash assembly at a distance from the picture-taking objective which is sufficiently great to prevent the above undesirable result, but then of course the camera would be undesirably bulky.

It is accordingly a primary object of the present invention to provide a camera of the above type which on the one hand, when set up for taking photographs with flash exposure, will reliably situate the reflector of the flash assembly at a distance from the picture-taking objective which is sufficiently great to prevent the iris of the eye of a person who is photographed from appearing red in a color photograph, while at the same time providing a camera which is practically of the same size as a conventional camera without a built-in flash assembly, when the camera of the invention has its flash assembly in a collapsed, inoperative position, as when the camera is not being used and is simply being carried about, for example.

Another object of the present invention is to provide a camera of the above type with a flash assembly which in a collapsed position does not undesirably increase the size of the camera while in an operative position the flash assembly has its reflector located sufficiently distant from the picture-taking objective to prevent the above-discussed undesirable result, while at the same time providing a construction where the flash assembly itself will in no way interfere with the operation of other camera components such as the viewfinder, range finder, or the like.

In particular, it is an object of the present invention to provide a structure of the above type where the flash assembly itself, while capable of accomplishing all of the above objects, at the same time contributes to the accommodation of other camera components.

It is furthermore an object of the present invention to provide for a structure of the above type an arrangement which will guarantee that when an exposure is made with flash illumination the exposure time is necessarily set at a value which is suitable for an exposure with flash illumination.

Yet another object of the present invention is to provide a camera structure of the above type which includes a camera housing member and a cap member mounted thereon to define with the camera housing member a chamber for accommodating camera components such as a viewfinder, range finder, light meter, and the like, and wherein the camera housing member itself can be of a conventional construction of the same basic type which is used in cameras which do not have a built-in flash assembly.

With the above objects in view the invention includes, in a camera which has a built-in flash assembly, a camera housing means which includes a camera housing member and a cap member mounted thereon and defining therewith a chamber for accommodating camera components. A flash means is operatively connected to the camera housing means for movement relative thereto between a collapsed position and an operating position, and in its operating position the flash means has a portion most remote from the camera housing means carrying a reflector and a lamp socket. In its collapsed position the flash means of the invention provides with the camera housing and cap members a camera outline which susbtantially conforms to the outline of a conventional camera which is not provided with a built-in flash assembly.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a diagrammatic front elevation of another embodiment of a camera according to the present invention;

FIG. 5 is a diagrammatic front elevation showing the flash means of FIG. 4 after it has been displaced from a collapsed position shown in FIG. 4 to an operating position shown in FIG. 5;

FIG. 6 is a front elevation of a third embodiment of a camera according to the present invention; and FIG. 7 shows the structure of FIG. 6 after a flash means of FIG. 6 has been displaced from a collapsed position shown in FIG. 6 to an operating position shown in FIG. 7.

Figure 1:
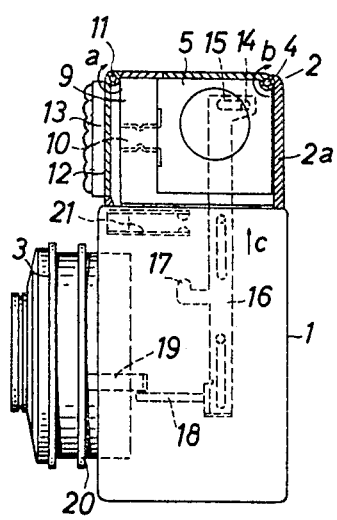
FIG. 1 is a partly sectional schematic side elevation of one possible embodiment of a camera structure according to the present invention.
Figure 2:
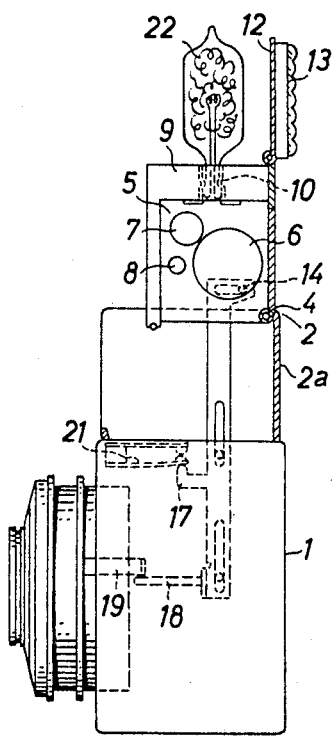
FIG. 2 shows the structure of FIG. 1 after a flash means of the structure has been displaced from a collapsed position shown in FIG. 1 to an operating position shown in FIG. 2.
Figure 3:
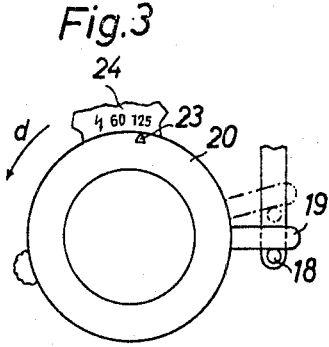
FIG. 3 is a diagramamtic front view of a structure for controlling the exposure time.

Referring now to FIGS. 1–3, there is shown therein a camera housing means which includes a camera housing member 1 and a cap member 2 mounted thereon and defining therewith a chamber for receiving such camera components as a viewfinder, range finder, light meter, and the like. Also shown in FIGS. 1 and 2 is the objective assembly 3 which carries in a known way not only the objective lenses but also the shutter structure of the camera.

A flash means is operatively connected to the camera housing means 1, 2 for movement relative thereto between a collapsed position shown in FIG. 1 and an operating position shown in FIG. 2, and this flash means includes the flash housing 5 which is pivotally connected to the rear wall 2a of the cap member 2, along an upper rear edge thereof, for turning movement relative to the cap member 2 about a horizontal axis provided by the elongated pivot member 4, the pivot axis of the flash housing means 5 extending perpendicularly with respect to the optical axis of the objective assembly 3 along the upper rear edge of the cap 2. The flash housing means 5 serves to accommodate electrical elements of the built-in flash assembly, in particular the battery 6, a capacitor 7, and a loading resistor 8, as well as unillustrated electrical conductors. The elongated pivot shaft 4 is preferably made in the form of a hollow tube so that the electrical conductors can conveniently pass along the interior of this tube into the camera housing member 1 and of course into the objective assembly 3 to cooperate with the shutter thereof in order to provide an exposure of a flash lamp in synchronism with the operation of the shutter, the shutter being provided for this purpose in a well known manner with contacts which engage each other and close a circuit to the flash lamp when the shutter is open, for example, or in any event in such a way as to provide the maximum illumination when the shutter is open. The flash housing means 5 has a wall 9 which is most distant from the camera housing means 1, 2, directed away from the latter and situated at the upper part of the housing means 5 when the flash means is in the operating position shown in FIG. 2, and this wall 9 carries a lamp socket 10 of conventional construction adapted to receive a flash lamp in a manner well known in the art. Moreover, a reflector means 12 is connected to the wall 9 for turning movement relative thereto between the position shown in FIG. 1 where the reflector means 12 covers the wall 9, and thus covers the socket 10 carried thereby, and the operating position shown in FIG. 2 where the reflector means 12 has a reflecting face located behind and directed toward the flash lamp 22 so as to reflect the light which results from the ignition of the flash lamp 22. The reflector 12 is pivotally connected by a pivot 11 to the housing means 5.

In the collapsed position of the flash means which is illustrated in FIG. 1, the flash means cooperates with the housing member 1 and the cap member 2 in order to provide therewith a camera outline which conforms substantially to the outline of a conventional camera which does not have a built-in flash means. Thus, in this position the flash housing means 5 provides above the camera housing member 1 a structure which substantially conforms to and forms part of the configuration of the cap member 2 so that the flash means does not project from the housing 1 to an extent greater than the cap member 2 and in fact appears to form a part of the latter. In this collapsed position of the flash means the reflector 12 is in a closed position located directly next to the wall 9 and covering the socket 10 as well as the wall 9. The chamber which is defined between the cap member 2 and the housing member 1 can accommodate camera components such as the viewfinder, range finder, and/or light meter. In the case where a light meter is provided it is of particular advantage to mount a photosensitive element 13 on the rear, non-reflecting face of the reflector 12, and it will be seen from FIG. 1 that when the flash means is in its collapsed position the photosensitive element 13 is directed forwardly since the rear face of the reflector 12 is at this time directed forwardly. The photosensitive element 13 is connected in an unillustrated manner through suitable conductors, which can pass through the elongated hollow pivots 11 and 4, or through suitable slip contacts, for example, with a light-measuring assembly.

The structure of the invention shown in FIGS. 1-3 is also capable of automatically providing an exposure time which is suitable for flash exposure whenever the flash means is displaced from the collapsed position of FIG. 1 to the operating position of FIG. 2, and for this purpose a side wall of the flash housing means 5 fixedly carries a pin 14 which extends into an elongated horizontal slot 15 which is formed at the upper end portion of an elongated motion transmitting bar 16 which is guided in any suitable way for vertical sliding movement, as viewed in FIGS. 1 and 2. This bar 16 is provided with a pair of extensions 17 and 18, and a switch 21 of the circuit of the flash assembly is located in the path of movement of the projections 17 to be automatically closed thereby when the flash means is displaced to its operating position, resulting in upward movement of the bar 16 from the position of FIG. 1 into the position of FIG. 2. FIGS. 1 and 2 show the bar 16 provided with longitudinal slots respectively receiving stationary pins which cooperate with the slots to guide the motion-transmitting bar 16 for longitudinal movement. Thus, the circuit of the flash assembly will always be open as long as the switch 21 is open, and the projection 17 will automatically close the switch 21 in order to render the flash circuit ready for operation whenever the flash means is displaced to the operating position shown in FIG. 2.

The projection 18 engages an elongated radial projection 19 which is fixed to a rotary exposure time setting means 20 in the form of a ring which concentrically surrounds the optical axis and which forms part of the objective assembly 3. Thus, during upward movement of the motion transmitting means 16, the upward movement of the latter, resulting from displacement of the flash housing means from the collapsed position of FIG. 1 to the operating position of FIG. 2, will result in transmission of motion through the bar 18 and the projection 19 to the exposure time setting means 20 for turning the latter in the direction of the arrow d, as indicated in FIG. 3.

In the event that the structure is in the position shown in FIG. 1 and that it is desired to make an exposure with flash illumination, then the reflector means 12 is turned in the direction of the arrow a, shown in FIG. 1, relative to the flash housing means 5, and the flash housing means 5 itself is turned relative to the cap 2 in the direction of the arrow b, also shown in FIG. 1, until the parts have the position indicated in FIG. 2, and now it is possible to introduce a flash lamp 22 into the socket 10. During the turning of the housing 5 from the position of FIG. 1 to the position of FIG. 2, the pin 14 shifts the motion transmitting means 16 in the direction of the arrow c, shown in FIG. 1, and in this way the projection 17 closes the switch 21. Moreover, the projection 18 engages the projection 19 of the exposure time setting ring 20 and turns the latter in the manner described above so as to automatically place the exposure time setting means in a position which will provide an exposure time which is suitable for a flash exposure. In order to indicate that the exposure time setting means is at a position suitable for flash exposure as well as to indicate further exposure time settings which can be made by hand, the exposure time setting ring 20 carries an index 23 which cooperates with a stationary scale 24 having graduations which indicate the exposure time, one of which is indicated as being suitable for flash exposure as by providing a schematic representation of a lighting bolt, for example.

It is possible to provide the structure with detent devices which enable the housing 5 and the reflector 12 to be releasably maintained in the positions of FIGS. 1 and 2. Moreover, it is possible to provide an arrangement where the housing 5 will be turned through an angle of more than 90° about the pivot 4, and in this case the reflector 12 will be directed upwardly or at least inclined in an upward direction so as to provide an indirect lighting of the subject which is to be photographed by directing light to a ceiling of a room or the like so as to be reflected by the ceiling. In order to improve the illumination it is possible to give the reflector means 12 a curved construction or it can be provided with turnable side elements.

Of course, it is possible to vary several of the details shown in FIGS. 1-3. For example, instead of making the reflector means 12 pivotal with respect to the housing means 5, it is possible to provide an arrangement where the reflector 12 is pulled out of the housing means 5, and of course it is also possible to provide an arrangement where the housing means 5 itself is pulled out of the camera housing means 1, 2, instead of being pivotally connected thereto as described above.

In particular, with the structure of the invention it has been found that the camera housing member 1 can be a conventional camera housing member of the same construction as a camera housing member of a camera which is not provided with a built-in flash assembly.

Referring now to the embodiment shown in FIGS. 4 and 5, this embodiment also includes a camera housing means made up of a camera housing member 101 and a cap member 102 mounted on the housing member 101 and defining therewith a chamber for accommodating components of the camera. The camera is also provided with an objective 103.

Within this chamber defined between the members 101 and 102 is situated a viewfinder assembly 104.

The structure includes a flash means 106 which in this case is pivotally connected to the cap member 102 for turning movement relative thereto about a pivot axis provided by the pivot 105 which extends parallel to the optical axis of the picture-taking objective 103. The pivot 105 is located directly under the uppermost surface 102a of the cap member 102 in the region of a side 102b thereof.

The flash means 106 is made up of a pair of frame members 106a and 106b which are fixed to each other and which are respectively formed with cutouts 107a and 107b for a purpose referred to below. The component which is accommodated in the chamber defined between the cap member 102 and the housing member 101 requires light, this component being in the illustrated example the viewfinder 104, although it equally may well be a range finder or light measuring structure, and in accordance with one feature of the invention the flash means 106 is formed with at least one cutout through which light passes to the component which requires light when the flash means is in its collapsed position. Thus, in the illustrated example it will be seen that when the flash means 106 is in the collapsed position of FIG. 4 the light can enter into the viewfinder through the cutout 107a in the frame member 106a, while the operator can look into the viewfinder through the smaller opening 107b formed in the rear frame member 106b. In the case where a range finder is provided it is of course possible to provide similar openings in the flash means through which light passes to such a range finder when the flash means is in its collapsed position indicated in FIG. 1, and the same of course applies to structure which may be situated beside the viewfinder for the purpose of reflecting into the field of the viewfinder frame limiting images which will indicate to the operator the limits of the area of the viewing field which will be reproduced on a photograph.

When the flash means 106 is turned from the position of FIG. 4, where it is collapsed, to the operating position illustrated in FIG. 5, the flash means has distant from the pivot 105 a portion which is both distant from the camera housing member 101 and cap member 102, and it is at this most distant portion of the flash means that the latter carries a reflector 108 and a lamp socket 109, these parts being fixedly carried by the flash means 106. A cover 111 is pivotally connected to a side edge of the reflector 108 for covering the reflector when the parts are in the position of FIG. 4 suitable for transporting the camera. In this latter position of the parts the cover 111 has a front surface which is flush with and forms an extension of the front surface of the cap member 102.

As is indicated in FIG. 5 when the flash means 106 is in the operating position of FIG. 5 a flash lamp 110 is adapted to be received in the socket 109 after the cover 111 has been moved away from the reflector 108.

In accordance with a further feature of the invention, the invention, the structure fo the invention will prevent the flash means from being displaced from the position of FIG. 4 into the position of FIG. 5 unless the exposure time has been set at a value which is suitable for a flash exposure, and thus the embodiment of FIGS. 4 and 5 will also guarantee that an exposure with flash illumination cannot be made unless the exposure time is set at a value suitable for an exposure with flash illumination. For this purpose the flash means 106 has a projection 112, and a releasable lock means is formed in part by the projection 112 and in part by a lock lever 114 which is pivotally carried at 113 by the camera housing member 101 for turning movement relative thereto about an axis parallel to the optical axis. The lock lever means 114 carries at its free end a projection engaged by the projection 112 to prevent the flash means 106 from being turned in a clockwise direction, as viewed in FIG. 4, from the position of FIG. 4 into the position of FIG. 5. The lock lever means 114 carries a control projection in the form of a pin 115 which normally engages the periphery 117 of a rotary exposure time setting means in the form of a rotary ring 118. A spring 116 is operatively connected to the lock lever means 114 to urge the latter in a clockwise direction which of course urges the projection 115 against the periphery 117 of the exposure time setting ring 118. This ring 118 is formed at one part of its periphery with a notch 121. Also, the exposure time setting ring 118 carries an index 119 which cooperates with a scale 120 of exposure times, this scale being stationary and carrying either numerically or symbolically indicated exposure times.

In the event that the exposure time setting means 118 is in the position of FIG. 4, for example, then the flash means is locked by the releasable lock means against movement from the collapsed position of FIG. 4 into the operating position of FIG. 5, and the structure can be very safely carried out with the parts in the position of FIG. 4. In this position it will be noted that the exposure time is not one which is suited for flash exposure, and of course the flash means 106 cannot be displaced from the collapsed position of FIG. 4. This result is brought about by the fact that the notched end 114a of the lock lever means 114 receives the projection 112 and also the periphery 117 of the ring 118 prevents the lever 114 from being turned by the spring 116 into the position of FIG. 5, so that the flash means is reliably prevented from being displaced at this time from the position shown in FIG. 4.

In the event that it is desired to make an exposure with flash illumination, then it is necessary initially to turn the exposure time setting means 118 in the direction of the arrow a (FIG. 4) until the index 19 is aligned with that symbolic or numerical graduation of the scale 120 which corresponds to an exposure time suitable for flash exposure, and when the ring 118 is displaced into this latter position the notch 121 is aligned with the pin 115 and the spring 116 can now turn the lever 114 to displace the pin 115 into the notch 121, and thus the free end of the lever 114 will be displaced beyond the projection 12 so that the flash means 6 can now be turned to the operating position shown in FIG. 2. Of course, any suitable releasable detent device or releasable, manually operable locking key arrangement may be provided for holding the flash means in the position of FIG. 5 until the operator wishes to return it to the position of FIG. 4. Also, once the parts have been displaced to the position of FIG. 5 it is necessary for the operator to turn the cover 111 away from the reflector 108 so as to expose the latter and the socket 109 in order that the lamp 110 may be received thereby.

In the embodiment of the invention which is illustrated in FIGS. 6 and 7, a miniature camera adapted to make photographs on less than normal-sized film is provided. The housing means 125 of the miniature camera carries an objective 126 and is provided with a viewfinder 127. At the junction between the upper wall 125a and side wall 125b, located adjacent the viewfinder 127, a pivot 128 is mounted on the housing 125, and this pivot 128 serves to pivotally connect a flash means 129 to the camera housing for turning movement relative thereto between the collapsed position of FIG. 6 and the operating position of FIG. 7. Thus, in this case also the flash means is turnable about an axis which is parallel to the optical axis of the picture-taking objective 126.

The flash means 129 of this embodiment includes an elongated substantially rectangular member having the configuration shown most clearly in FIG. 7 carrying at its portion which is most remote from the housing 125, a reflector 130 and a lamp socket 133. Also, as is shown in FIG. 7, the elongated flash means 129, in the form of a suitable frame member, is formed with cutouts 131 and 132.

When the flash means 129 is in the collapsed position of FIG. 6, the flash means of this embodiment is located in the interior of the camera housing means 125, so that the reflector 130 is situated in the interior of the housing 125 and the location of the cutouts 131 and 132 is such that the light which passes through the objective 126 will pass also through the cutout 131, while the light which passes through the viewfinder 127 will also pass through the cutout 132, so that in this way the cutouts of this embodiment will not prevent normal operation of the camera components when the flash means 129 is in its collapsed position. Of course, it is possible with this embodiment to situate the reflector 130 at the exterior of the housing 125, behind the latter, in the collapsed position of the flash means where the camera is set for being transported. The flash means need only be moved from the position of FIG. 6 into the position of FIG. 7 in order to provide photographs with flash exposure, and with this embodiment as well as with any of the other embodiments the reflector of the flash means is located, in the operating position of the flash means, at a distance from the objective of the camera which is sufficiently great to prevent the iris of the eye of a person who is photographed from appearing red in a color photograph.

The reflector 30 can have a dished configuration and of course surrounds the socket 133. Moreover, it is possible to situate behind the reflector 130, in the same way as with the other embodiments, further components of the flash assembly such as, for example, capacitors or resistances. In order to releasably hold the flash means 129 with its reflector 130 in the positions indicated in FIGS. 6 and 7, it is possible to use well known and unillustrated releasable detent structures.

Of course, the invention is not limited to the specific details set forth above, thus the structure of the invention can be used with cameras of a different construction than that described above, and it is possible to provide the flash means with cutouts through which light can pass to a light meter, in particular to a light meter cooperating with a photosensitive resistor, when the flash means is in its collapsed position. Moreover, it is possible to provide a structure composed of telescoped elements enabling, for example, the reflector to be pulled away from the remainder of the flash means during an elongation of the latter into an operating position where the telescoped elements are slidably moved relative to each other to an expanded position, and of course with such a construction the telescoped elements could be shifted to a position located one within the other in order to shorten the length of the assembly.

Furthermore, although in the embodiments of FIGS. 4-7 the flash means has been disclosed as only being provided with cutouts through which light can pass to a component requiring light, it is also possible for the flash means itself to carry in these cutouts suitable optical elements, so that in this way the flash means will also carry part of the optical structure required for other camera components.

It will be understood that each of the elements described above, or two or more together, may also find a useful application in other types of cameras differing from the types described above.

While the invention has been illustrated and described as embodied in cameras with built-in flash assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera with a built-in flash assembly, in combination, a camera housing member, a cap member mounted on said camera housing member and defining therewith a chamber for accommodating components of the camera, flash means for providing flash illumination, said flash means being operatively connected to one of said members for movement relative thereto between a collapsed position where said flash means is relatively close to said members and an operating position where said flash means projects from said members and has a portion most distant from said members, said flash means having at said portion which is most distant from said members when said flash means is in said operating position thereof a reflector and a lamp socket, and said flash means when in said collapsed position thereof providing with said cap member and housing member a camera outline substantially conforming to the outline of a conventional camera without a built-in flash assembly; exposure time setting means carried by said camera housing member; and means compelling said exposure time setting means to provide an exposure time suitable for flash exposure when said flash means is displaced from said collapsed to said operating position thereof, said compelling means comprising releasable lock means engaging said flash means to prevent movement thereof from said collapsed to said operating position except when said exposure time setting means has a position providing an exposure time suitable for flash exposure, said exposure time setting means when placed in said latter position cooperating with said releasable lock means to actuate the latter for releasing said flash means for movement from said collapsed to said operating position thereof.

2. In a camera with a built-in flash assembly, in combination, camera housing means including a housing member and a cap member mounted thereon and defining therewith a space for accommodating camera components; a flash housing means housing components of a flash assembly, such as a battery, capacitor, and the like, said flash housing means being connected to said camera housing means for movement relative thereto between a collapsed position located close to said members and providing therewith a camera outline conforming substantially to the outline of a conventional camera which is not provided with a built-in flash assembly, and a operating position extending upwardly from said cap member and having a wall distant from and directed away from said members, said wall being located at the front of said flash housing means when the latter is in its collapsed position and said wall carrying a lamp socket which is vertically oriented when said flash housing means is in said operating position thereof; and a reflector means operatively connected to said flash housing means for movement relative thereto between a covering position covering said wall and said lamp socket and an operating position extending from said wall and acting as a reflector for a lamp carried by said socket, said reflector means having a reflecting face directed toward said wall when said reflector means is in said covering position covering said wall, and said reflector means having an opposed face carrying a photosensitive means which is directed forwardly when said flash housing means is in said collapsed position thereof and said reflector means is in said position covering said wall of said flash housing means.

3. In a camera as recited in claim 2, said flash housing means together with said reflector means being movable relative to said camera housing means to a selected one of a plurality of positions in which a lamp carried by said socket will provide through said reflector means, upon ignition of said lamp, either direct lighting or indirect lighting.

4. In a camera with a built-in flash assembly, in combination, camera housing means including a camera housing member and a cap member mounted thereon and defining therewith a chamber for accommodating at least one camera component which requires light; elongated flash means operatively connected to said camera housing means for movement relative thereto between a collapsed position and an operating position projecting from said camera housing means and having a portion most remote therefrom carrying a reflector and lamp socket, said flash means when in said collapsed position thereof providing with said housing member and cap member a camera outline which conforms substantially to that of a conventional camera without a flash assembly built into the same, said flash means being formed with a cutout through which light passes to said component when said flash means is in said collapsed position thereof; locking lever means engaging said flash means when the latter is in said collapsed position thereof for preventing movement of said flash means to said operating position thereof; a spring operatively connected to said locking lever means for urging the latter to a position releasing said flash means for movement from said collapsed to said operating position thereof; and rotary exposure time setting means carried by said housing member and having a peripheral surface engaging said lever means for maintaining the latter in opposition to said spring in a position preventing movement of said flash means to said operating position until said exposure time setting means is placed in a position providing an exposure time which is suitable for flash exposure, said exposure time setting means being formed at said peripheral surface with a notch and said lever means having a portion freely movable into said notch in response to movement of said lever means by said spring when said exposure time setting means is set to a position providing an exposure time suitable for flash exposure, so that only in the latter position of said exposure time setting means can said flash means be moved to said operating position thereof to provide an exposure with flash illumination.

5. In a camera, in combination, housing means having a light-admitting opening; at least one camera component of the type requiring light for proper operation thereof and positioned in said housing means to receive light through said opening; and flash means operatively connected to said housing means for movement between a collapsed position located in the path of light passing through said opening and an operating position outside of said path, said flash means having a cutout which registers with said opening in said collapsed position of said flash means so that said component can receive light which passes through said opening in the operating position and through said opening and said cutout in the collapsed position of said flash means.

6. A structure as set forth in claim 5, wherein said housing means defines a space which accommodates said cutout in the collapsed position of said flash means.

7. A structure as set forth in claim 5, further comprising pivot means connecting said flash means to said housing means for movement between said positions, said flash means having a portion most remote from said housing means in said operating position of the flash means and carrying a reflector and a lamp socket, said cutout being located intermediate said reflector and said pivot means.

References Cited by the Examiner
UNITED STATES PATENTS

| | | | |
|---|---|---|---|
| 2,783,696 | 3/1957 | Sewig | 95—11 |
| 3,051,066 | 8/1962 | Lareau | 95—11.5 |

JOHN M. HORAN, *Primary Examiner.*